United States Patent
Chung et al.

(10) Patent No.: US 11,495,951 B2
(45) Date of Patent: Nov. 8, 2022

(54) WATERPROOF DEVICE

(71) Applicant: PEGATRON CORPORATION, Taipei (TW)

(72) Inventors: Ming-Ju Chung, Taipei (TW); Chun-Liang Yeh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 245 days.

(21) Appl. No.: 17/014,844

(22) Filed: Sep. 8, 2020

(65) Prior Publication Data

US 2021/0126442 A1    Apr. 29, 2021

(30) Foreign Application Priority Data

Oct. 24, 2019   (TW) .................................. 108138395

(51) Int. Cl.
| | |
|---|---|
| *H02G 15/013* | (2006.01) |
| *H02G 3/08* | (2006.01) |
| *H01R 13/52* | (2006.01) |
| *H02G 3/06* | (2006.01) |
| *F16L 5/10* | (2006.01) |
| *F16J 15/10* | (2006.01) |
| *F16J 15/06* | (2006.01) |

(52) U.S. Cl.
CPC ......... *H02G 3/088* (2013.01); *H01R 13/5205* (2013.01); *H02G 15/013* (2013.01); *F16J 15/061* (2013.01); *F16J 15/104* (2013.01); *F16L 5/10* (2013.01); *H02G 3/0691* (2013.01)

(58) Field of Classification Search
CPC .. H01R 13/5205; H02G 3/088; H02G 15/013; H02G 3/0691; F16J 15/027; F16J 15/061; F16J 15/104; F16L 5/10

USPC ........................................................ 174/659
See application file for complete search history.

(56) References Cited

U.S. PATENT DOCUMENTS 3,109,662 A * 11/1963 Bergstrom ................ F16L 5/10
                                                       277/606
5,973,271 A * 10/1999 Fujita ........................ F16L 5/10
                                                       174/152 G (Continued)

FOREIGN PATENT DOCUMENTS

| CN | 208224963 | 12/2018 |
|---|---|---|
| TW | M387260 | 8/2010 |
| TW | I383729 | 1/2013 |

*Primary Examiner* — Timothy J Thompson
*Assistant Examiner* — Michael F Mcallister
(74) *Attorney, Agent, or Firm* — J.C. Patents

(57) ABSTRACT

A sealing device adapted for an object to be disposed through is provided. The sealing device includes a casing, a sealing elastic member, and a pressing member. The casing has an accommodating groove and a penetrating via communicated with the accommodating groove. The sealing elastic member is detachably disposed in the accommodating groove and has a through hole aligned with the penetrating via. The sealing elastic member is adapted to be compressed along an axis. The through hole has a first inner diameter before compression and a second inner diameter after compression. An outer dimension of the object is less than or equal to the first inner diameter and greater than the second inner diameter. The pressing member is detachably disposed at the casing and presses against the sealing elastic member, so that the compressed sealing elastic member is fixed in the accommodating groove.

10 Claims, 7 Drawing Sheets

(56) References Cited

U.S. PATENT DOCUMENTS

| | | | | |
|---|---|---|---|---|
| 6,490,947 B2 * | 12/2002 | Burger | ............... | F16C 1/262 |
| | | | | 74/502.6 |
| 6,634,252 B2 * | 10/2003 | Mayville | ............ | F16C 1/105 |
| | | | | 74/502.6 |
| 2007/0216110 A1 * | 9/2007 | Stuckmann | ......... | H02G 3/088 |
| | | | | 277/607 |

* cited by examiner

WATERPROOF DEVICE

CROSS-REFERENCE TO RELATED APPLICATION

This application claims the priority benefit of Taiwan application no. 108138395, filed on Oct. 24, 2019. The entirety of the above-mentioned patent application is hereby incorporated by reference herein and made a part of this specification.

BACKGROUND

Technical Field

The disclosure relates to a sealing device, and particularly relates to a waterproof sealing device.

Description of Related Art

Generally, in order to make a junction between an object (such as a wire) passing through a casing and the casing waterproof, adhesive dispensing is generally adopted to seal the junction between the wire and the casing to prevent water from infiltrating. However, it requires an additional dispensing process, which is relatively complicated in a manufacturing process, and rework is not easy. Alternatively, if an object (such as a connector) is required to pass through the casing, a waterproof connector may be directly used on the casing to achieve a waterproof effect between the casing and the object. However, a high price of the waterproof connector may increase the cost.

SUMMARY

The disclosure is directed to a sealing device, which has a good waterproof effect, and has lower cost and a simple structure.

The disclosure provides a sealing device adapted for an object to be disposed through, wherein the object has an outer dimension, and the sealing device includes a casing, a sealing elastic member and a pressing member. The casing has an accommodating groove and a penetrating via communicated with the accommodating groove. The sealing elastic member is detachably disposed in the accommodating groove and has a through hole aligned with the penetrating via. The sealing elastic member is adapted to be compressed along an axis, the through hole of the sealing elastic member has a first inner diameter before compression along the axis, and has a second inner diameter after compression. The outer dimension of the object is less than or equal to the first inner diameter and greater than the second inner diameter. The object is adapted to be disposed through the through hole and the penetrating via, wherein the axis is perpendicular to a cross-section of the penetrating via. The pressing member is detachably disposed at the casing at a portion close to the accommodating groove, and presses against the sealing elastic member, so that the sealing elastic member fills a gap between the object and the casing.

Based on the above description, the sealing device of the disclosure adopts the sealing elastic member adapted to be compressed and deformed along the axis, the sealing elastic member is disposed between the object and the casing, and the pressing member presses against the sealing elastic member to make the sealing elastic member filling the gap between the object and the casing to achieve a waterproof effect. Therefore, the sealing device of the disclosure achieves the good waterproof effect through a simple and low-cost structure and is quite convenient in assembling.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
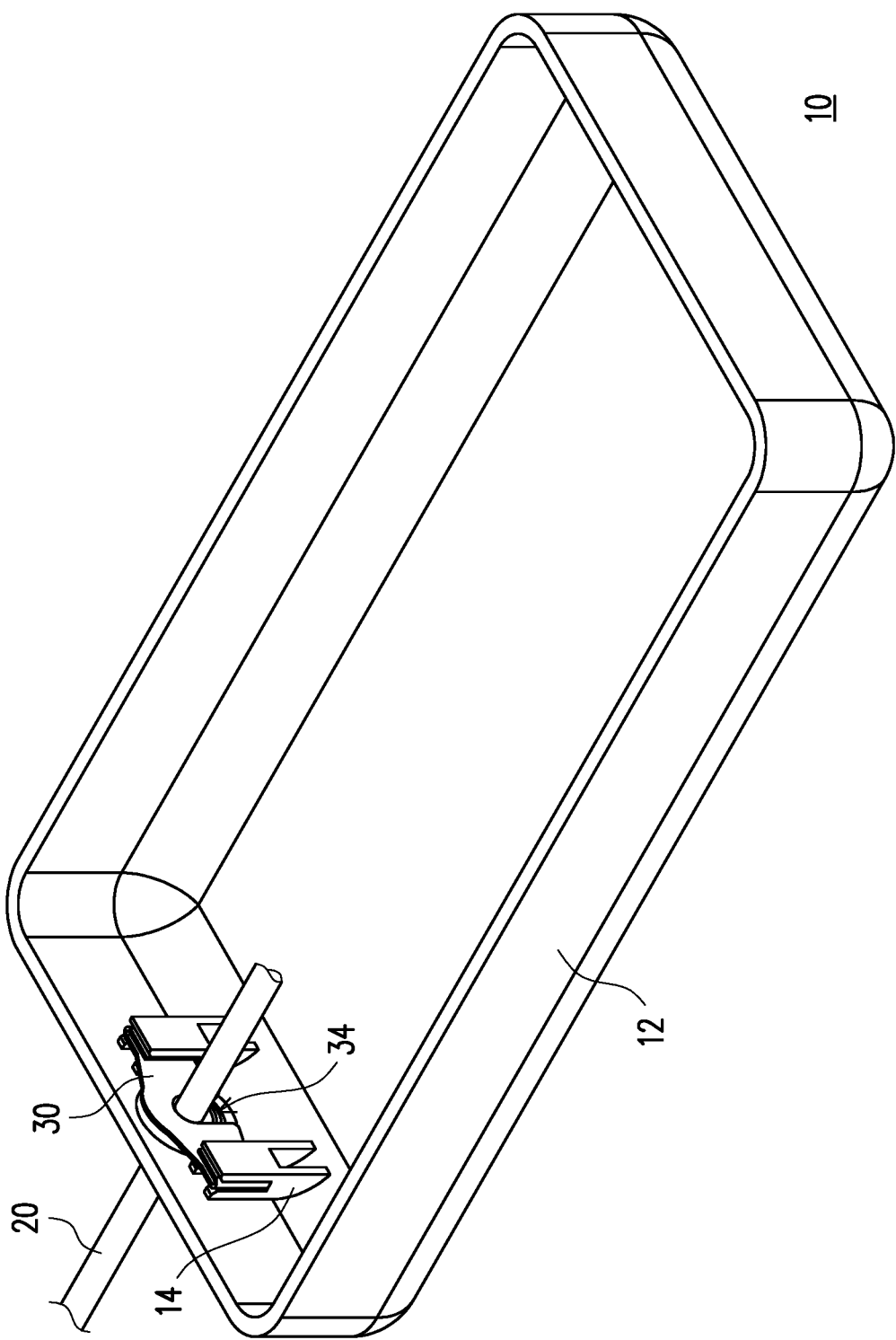
FIG. 1 is a schematic diagram of a sealing device according to an embodiment of the disclosure.

FIG. 1 is a schematic diagram of a sealing device according to an embodiment of the disclosure. Referring to FIG. 1, the sealing device 10 of the embodiment is adapted for an object 20 to be disposed through. In the embodiment, the sealing device 10 is, for example, a bicycle watch, but the type of the sealing device 10 is not limited thereto. In other embodiments, the sealing device 10 may also be a mobile phone, a tablet computer or a notebook computer. The object 20 includes a wire. However, in other embodiments, the object 20 may also be a connector, and the type of the object 20 is not limited thereto.

In the embodiment, since the object 20 is disposed through a casing 12 of the sealing device 10, the sealing device 10 of the embodiment has a special design to avoid water leakage at a junction between the object 20 and the casing 12 of the sealing device 10 due to a gap formed at the junction, so as to achieve a waterproof effect, which is explained in detail below.

Figure 2:
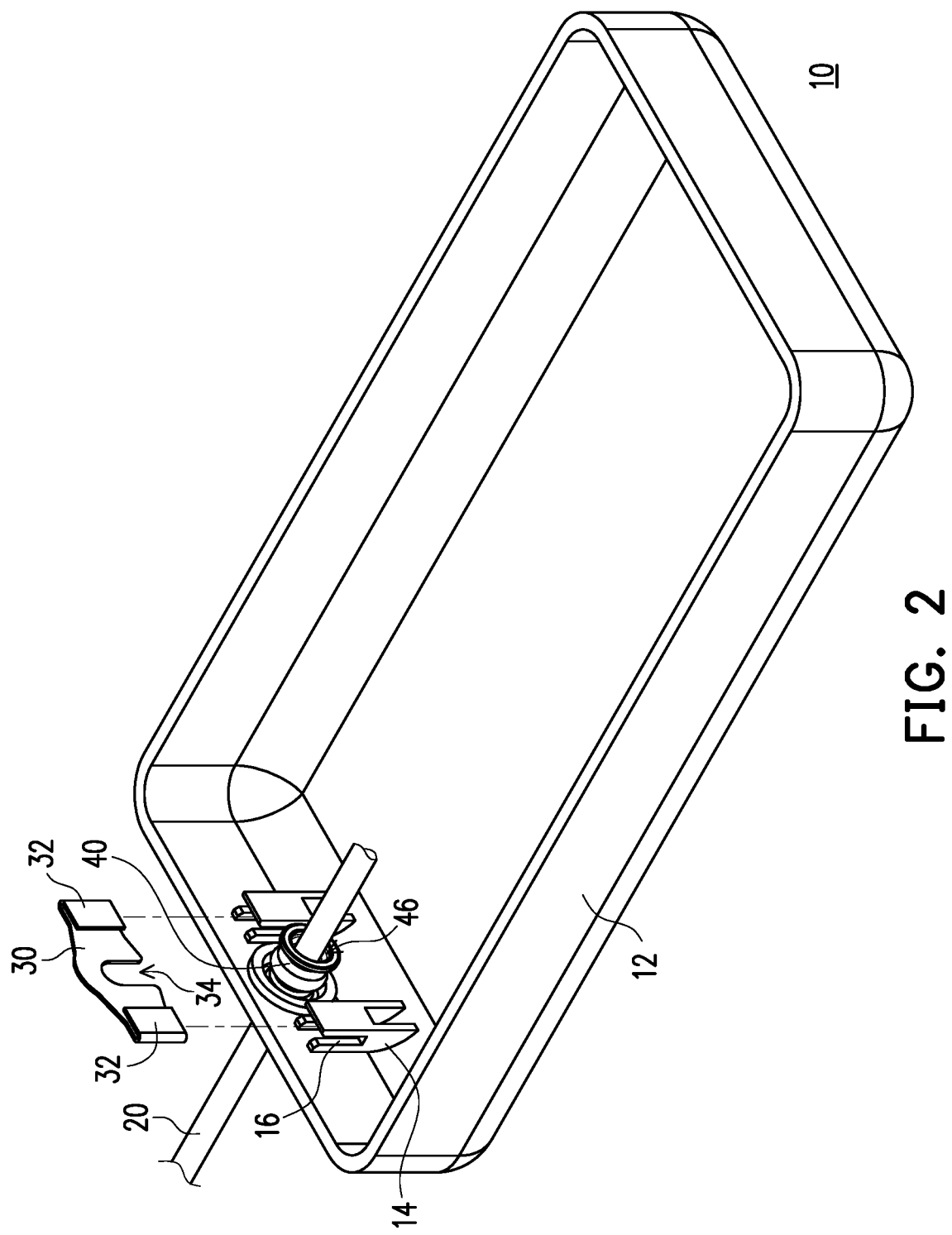
FIG. 2 is a schematic diagram of the sealing device of FIG. 1 with a lifted pressing member.
Figure 3:
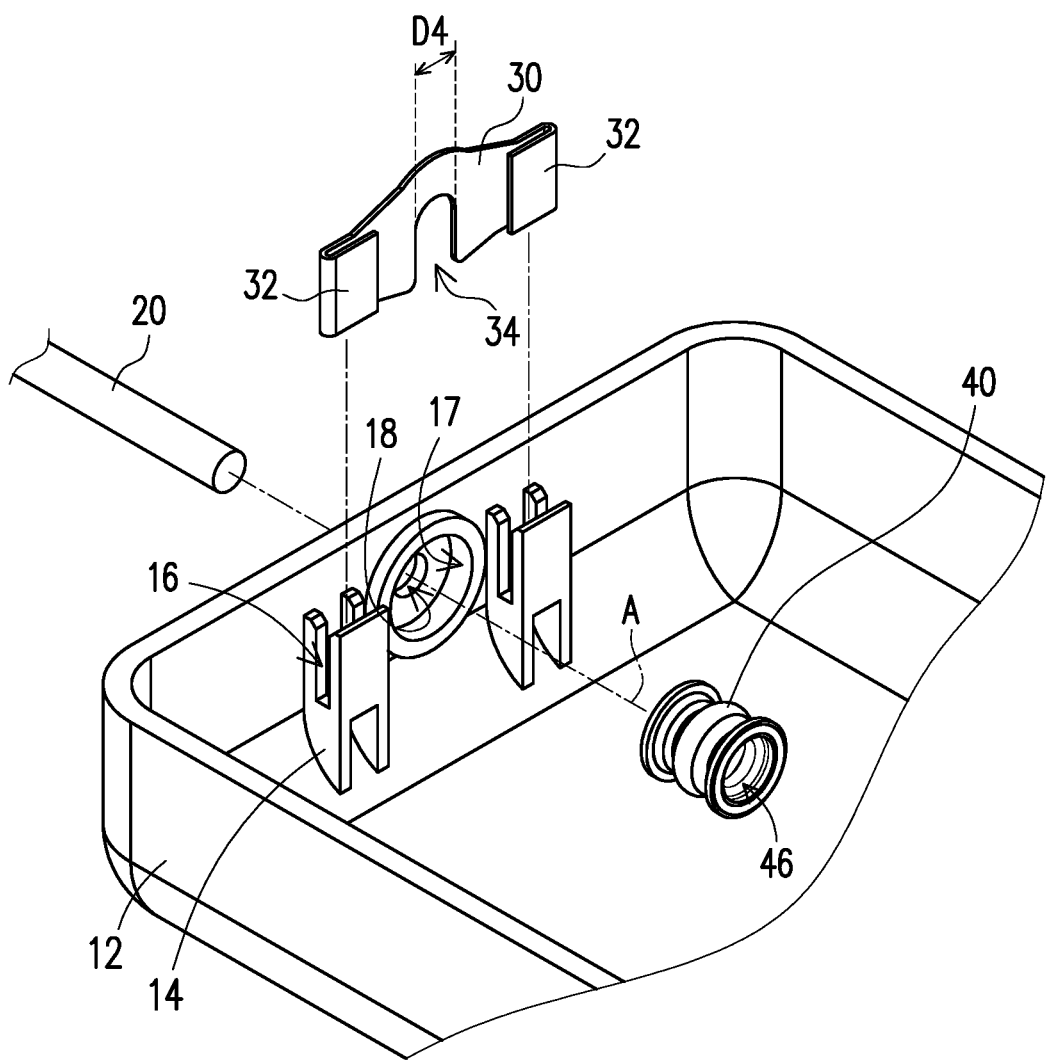
FIG. 3 is a partial exploded view of FIG. 1.
Figure 4A:
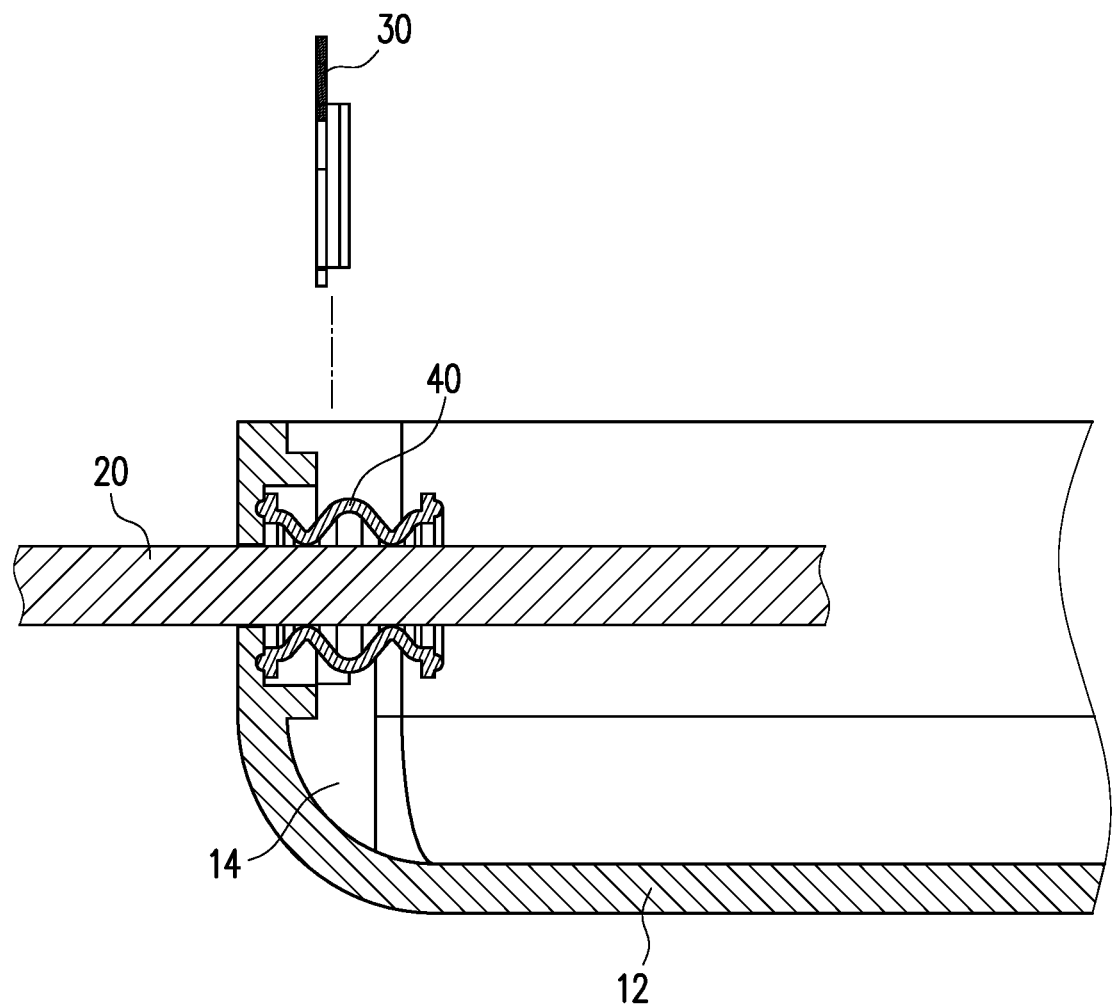
FIG. 4A is a cross-sectional schematic view of FIG. 2.
Figure 4B:
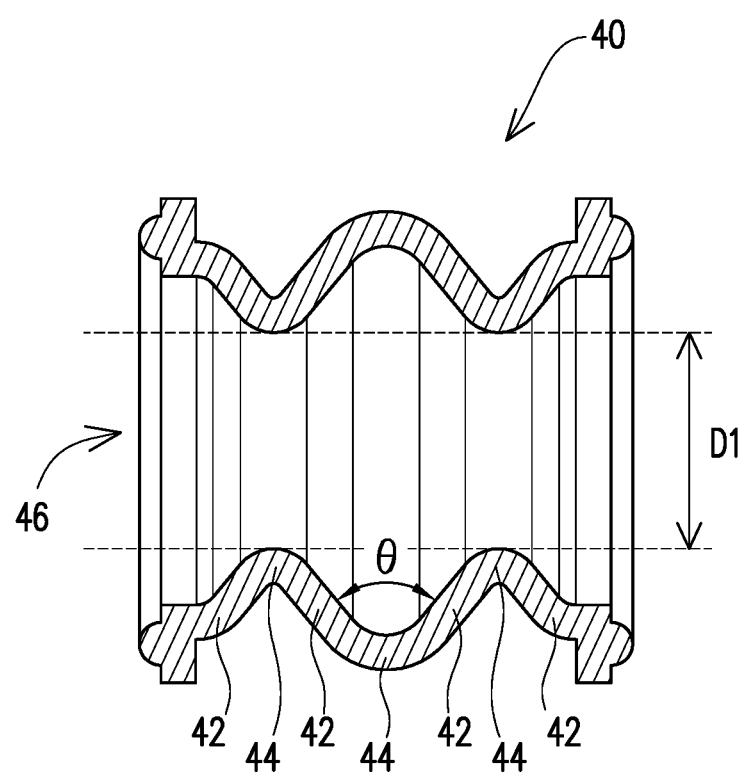
FIG. 4B is a cross-sectional schematic view of a sealing elastic member of the sealing device of FIG. 1 before compression.
Figure 5A:
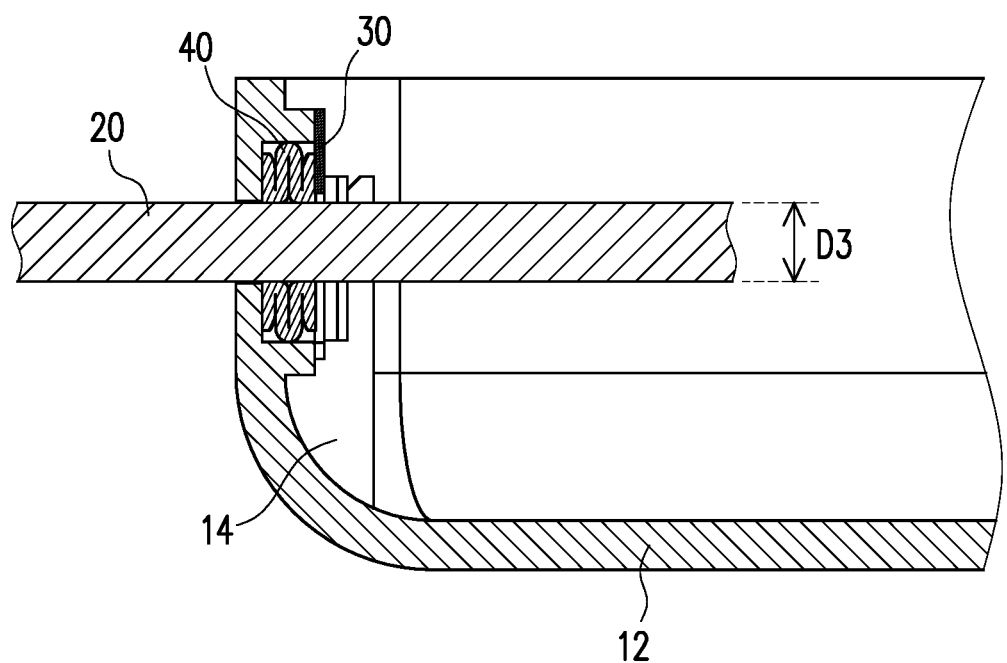
FIG. 5A is a partial cross-sectional schematic view of the sealing device of FIG. 1.
Figure 5B:
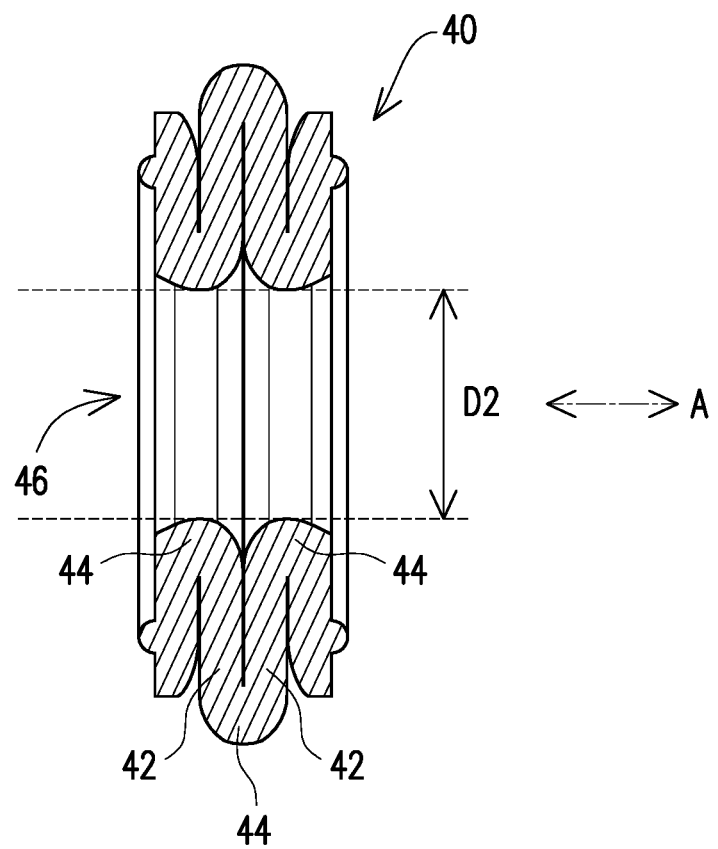
FIG. 5B is a cross-sectional schematic view of the sealing elastic member of the sealing device of FIG. 1 after compression.

FIG. 2 is a schematic diagram of the sealing device of FIG. 1 with a lifted pressing member. FIG. 3 is a partial exploded view of FIG. 1. FIG. 4A is a cross-sectional schematic view of FIG. 2. FIG. 4B is a cross-sectional schematic view of a sealing elastic member of the sealing device of FIG. 1 before compression. FIG. 5A is a partial cross-sectional schematic view of the sealing device of FIG. 1. FIG. 5B is a cross-sectional schematic view of the sealing elastic member of the sealing device of FIG. 1 after compression.

Referring to FIG. 2 to FIG. 5B, in the embodiment, the sealing device 10 includes the casing 12, a sealing elastic member 40 and a pressing member 30. As shown in FIG. 3, the casing 12 has an accommodating groove 17 and a penetrating via 18 communicated with the accommodating groove 17. Moreover, in the embodiment, the casing 12 further includes two fixing bases 14 located at two sides of the accommodating groove 17.

The sealing elastic member 40 is detachably disposed in the accommodating groove 17 and has a through hole 46 aligned with the penetrating via 18. In the embodiment, a material of the sealing elastic member 40 includes rubber or silicone, but the material of the sealing elastic member 40 is not limited thereto.

It should be noted that as shown in FIG. 4B, in the embodiment, the sealing elastic member 40 includes a plurality of inclined portions 42 and a plurality of bending portions 44 arranged in an interleaving manner to form a multilayer concave-convex structure. To be specific, in the embodiment, as viewed from left to right in FIG. 4B, the sealing elastic member 40 is, for example, formed by sequentially connecting the inclined portion 42 gradually shrinking inward, the bending portion 44, the inclined portion 42 gradually expanding outward, the bending portion 44, the inclined portion 42 gradually shrinking inward, the bending portion 44, and the inclined portion 42 gradually expanding outward, and the bending portion 44 presents a rounded corner, so that a cross-section of the sealing elastic member 40 along an axis A is wavy, where the axis A is perpendicular to a cross-section of the penetrating via 18.

Certainly, the numbers of the inclined portions 42 and the bending portions 44 are not limited thereto, and in other embodiments, the bending portion 44 may also present a sharp corner, such that the cross-section of the sealing elastic member 40 along the axis A is serrated. In an embodiment, the concave-convex structure of the sealing elastic member 40 is adapted to be compressed along the axis A.

Moreover, in the embodiment, before the sealing elastic member 40 is compressed, an included angle θ between any two adjacent inclined portions 42 is between 60 degrees and 90 degrees. If the included angle θ is too small, compression deformation of the sealing elastic member 40 is smaller. If the included angle θ is too large, the sealing elastic member 40 needs to be compressed by a greater force, and is not easy to be deformed along the axis A. Therefore, a range of the included angle θ enables the sealing elastic member 40 to have enough compression deformation, and is easy to be compressed along the axis A.

In the embodiment, the sealing elastic member 40 is not only flexible in material, but may also provide a large deformation along the axis A in structural design, so as to provide a good deformation effect.

As shown in FIG. 4B and FIG. 5B, the through hole 46 of the sealing elastic member 40 has a first inner diameter D1 before compression along the axis A and has a second inner diameter D2 after compression. In the embodiment, the first inner diameter D1 of the sealing elastic member 40 is between 2.5 mm and 3.5 mm, the second inner diameter D2 is between 1.8 mm and 2.8 mm, but the sizes of the first inner diameter D1 and the second inner diameter D2 are not limited thereto. An outer dimension D3 of the object 20 is less than or equal to the first inner diameter D1 and greater than the second inner diameter D2, and the outer dimension D3 of the object 20 is between 2 mm and 3 mm, but the outer dimension D3 of the object 20 is not limited thereto.

It should be noted that when the sealing elastic member 40 is compressed, not only the inner diameter becomes smaller, but also the outer diameter is increased. When the sealing elastic member 40 is disposed between the object 20 and the casing 12, the decreased inner diameter and the increased outer diameter of the sealing elastic member 40 are adapted to press against the object 20 and a wall surface of the accommodating groove 17 encircled by the casing 12 tightly, i.e., fill up a gap between the object 20 and the casing 12 to achieve a waterproof effect.

Moreover, an inner contour of a projection of the sealing elastic member 40 along the axis A may correspond to an outer contour of the object 20, so as to provide a uniform annular wrapping force to the object 20. According to FIG. 3, it is known that in the embodiment, since a cross-section of the object 20 cross-sectioning the axis A is circular, a projection of the sealing elastic member 40 on a plane (not shown, which is a plane perpendicular to the axis A, or a normal direction of the plane is parallel to the axis A) along the axis A is also correspondingly circular.

Certainly, in other embodiments, if the object 20 is a connector, the outer contour of the object 20 may be rectangular or irregular, the projection of the sealing elastic member 40 on the plane along the axis A may also be correspondingly rectangular or irregular. Certainly, the outer contour of the object 20 and the inner contour of the sealing elastic member 40 may also be polygonal, and the shape of the sealing elastic member 40 is not limited thereto.

The pressing member 30 is detachably disposed at the casing 12 at a portion adjacent to the accommodating groove 17. In the embodiment, the pressing member 30 has two folded elastic arms 32 at both sides, the two folded elastic arms 32 of the pressing member 30 are respectively inserted into slots 16 of the two fixing bases 14 to position the pressing member 30 in the casing 12. Since the folded elastic arms 32 are slightly flexible, when the folded elastic arms 32 are inserted into the slots 16 of the fixing bases 14, the folded elastic arms 32 may be closely attached to wall surfaces of the fixing bases 14 beside the slots 16, so that the folded elastic arms 32 cannot be shaken relative to the fixing base 14. Certainly, in other embodiments, the pressing member 30 may also be fixed on the casing 12 by other means such as locking, riveting, welding, bonding, or integral molding, etc., and the design of the pressing member 30 is not limited thereto.

Moreover, in the embodiment, the pressing member 30 has a concave hole 34, and the concave hole 34 of the pressing member 30 corresponds to the through hole 46 of the sealing elastic member 40 and the penetrating via 18 of the casing 12, and a dimension D4 of the concave hole 34 is greater than the outer dimension D3 of the object 20. In the embodiment, the object 20 is adapted to be disposed through the through hole 46 of the sealing elastic member 40 and the penetrating via 18 of the casing 12. After the sealing elastic member 40 is compressed, the pressing member 40 fixed to the casing 12 presses against the sealing elastic member 40, so that the compressed sealing elastic member 40 is fixed in the accommodating groove 17. In detail, the compressed sealing elastic member 40 presses against the object 20 and the wall surface of the accommodating groove 17 encircled by the casing 12 tightly. In this case, the sealing elastic member 40 is deformed in a direction perpendicular to the axis A, and has a smaller inner diameter and a larger outer diameter, so as to achieve the effect of pressing the object 20 tightly and filling the accommodating groove 17 to achieve the waterproof effect.

Since the sealing elastic member 40 is pushed and fixed by the pressing member 30, in case of disassembling, an assembler only needs to remove the pressing member 30, and the sealing elastic member 40 may be restored to its original state, and the object 20 may be easily pulled out of the sealing elastic member 40. Therefore, the sealing device 10 is not only easy in assembling, but is also convenient for rework.

In summary, the sealing device of the disclosure adopts the sealing elastic member adapted to be compressed and deformed along the axis, the sealing elastic member is disposed between the object and the casing, and the pressing member presses against the sealing elastic member to make the sealing elastic member filling the gap between the object and the casing to achieve the waterproof effect. Therefore, the sealing device of the disclosure may achieve the good waterproof effect through a simple and low-cost structure and is quite convenient in assembling.

What is claimed is:

1. A sealing device, adapted for an object to be disposed through, wherein the object has an outer dimension, the sealing device comprising:
   a casing, having an accommodating groove and a penetrating via communicated with the accommodating groove;
   a sealing elastic member, detachably disposed in the accommodating groove and having a through hole aligned with the penetrating via, wherein the sealing elastic member is adapted to be compressed along an axis, the through hole of the sealing elastic member has a first inner diameter before compression along the axis and a second inner diameter after compression, the outer dimension of the object is less than or equal to the first inner diameter and greater than the second inner diameter, and the object is adapted to be disposed through the through hole and the penetrating via, wherein the axis is perpendicular to a cross-section of the penetrating via; and
   a pressing member, detachably disposed at the casing and pressing against the sealing elastic member, so that the compressed sealing elastic member is fixed in the accommodating groove.

2. The sealing device as claimed in claim 1, wherein the sealing elastic member comprises a plurality of inclined portions and a plurality of bending portions arranged in an interleaving manner to form a multilayer concave-convex structure, and a cross-section of the sealing elastic member along the axis is wavy or serrated.

3. The sealing device as claimed in claim 2, wherein before the sealing elastic member is compressed, an included angle between any two adjacent inclined portions is between 60 degrees and 90 degrees.

4. The sealing device as claimed in claim 1, wherein the casing comprises two fixing bases located at two sides of the accommodating groove, and the pressing member is inserted in the two fixing bases.

5. The sealing device as claimed in claim 4, wherein the pressing member has two folded elastic arms at two sides, and the two folded elastic arms are respectively inserted in the two fixing bases.

6. The sealing device as claimed in claim 1, wherein the pressing member has a concave hole, the concave hole of the pressing member corresponds to the through hole of the sealing elastic member and the penetrating via of the casing, and a dimension of the concave hole is greater than the outer dimension of the object.

7. The sealing device as claimed in claim 1, wherein an inner contour of a projection of the sealing elastic member on a plane along the axis corresponds to an outer contour of the object.

8. The sealing device as claimed in claim 1, wherein a projection of the sealing elastic member on a plane along the axis is circular or polygonal.

9. The sealing device as claimed in claim 1, wherein a material of the sealing elastic member comprises rubber or silicone.

10. The sealing device as claimed in claim 1, wherein the object comprises a wire or a connector.

* * * * *